(12) United States Patent
Bechara et al.

(10) Patent No.: US 7,160,944 B2
(45) Date of Patent: Jan. 9, 2007

(54) PROCESS FOR THE PREPARATION OF A POLYOLEFIN EMULSION AND HYBRID POLYOLEFIN-POLYURETHANE DISPERSION DERIVED THEREFROM

(75) Inventors: Ibrahim Bechara, Carmel, NY (US); Pavel Ilmenev, Ridgefield, CT (US); Oleg Tselnik, Brooklyn, NY (US)

(73) Assignee: Crompton Corporation, Middlebury, CT (US)

( * ) Notice: Subject to any disclaimer, the term of this patent is extended or adjusted under 35 U.S.C. 154(b) by 207 days.

(21) Appl. No.: 10/464,128

(22) Filed: Jun. 17, 2003

(65) Prior Publication Data

US 2004/0260008 A1    Dec. 23, 2004

(51) Int. Cl.
*C08L 25/02*    (2006.01)

(52) U.S. Cl. .................. 524/458; 525/240; 523/202; 523/217

(58) Field of Classification Search .................. 525/66, 525/69, 123, 127, 130, 185, 191, 197, 240; 524/315, 186, 244, 247, 458; 523/326, 336, 523/202, 217; 428/391, 523
See application file for complete search history.

(56) References Cited

U.S. PATENT DOCUMENTS

| | | | |
|---|---|---|---|
| 3,814,715 A | 6/1974 | Nalley et al. | |
| 4,240,944 A | 12/1980 | Temple | |
| 4,283,322 A | 8/1981 | Temple | |
| 4,507,430 A | 3/1985 | Shimada et al. | |
| 4,728,573 A | 3/1988 | Temple | |
| 5,004,784 A | 4/1991 | Huynh-Ba | |
| 5,389,440 A * | 2/1995 | Arpin et al. | 428/391 |
| 5,430,093 A | 7/1995 | Miyamoto et al. | |
| 6,008,286 A | 12/1999 | Groves | |
| 6,166,118 A * | 12/2000 | Hyche et al. | 524/315 |
| 6,339,125 B1 | 1/2002 | Bechara et al. | |
| 6,465,559 B1 | 10/2002 | Bechara et al. | |

FOREIGN PATENT DOCUMENTS

| FR | 2 588 263 | 10/1985 |
|---|---|---|
| WO | WO 02/36654 A2 | 5/2002 |

* cited by examiner

*Primary Examiner*—Robert D. Harlan
(74) *Attorney, Agent, or Firm*—Michael P. Dilworth

(57) ABSTRACT

A process for making an aqueous emulsion of polyolefin employs a functionalized emulsification facilitating compound. The aqueous emulsion can be used to prepare a hybrid polyolefin-polyurethane dispersion useful, inter alia, as an adhesion-promoting coating for polymers such as the polyolefins.

42 Claims, No Drawings

PROCESS FOR THE PREPARATION OF A POLYOLEFIN EMULSION AND HYBRID POLYOLEFIN-POLYURETHANE DISPERSION DERIVED THEREFROM

BACKGROUND OF THE INVENTION

1. Field of the Invention

This invention relates to a process of making an aqueous emulsion of relatively high molecular weight polyolefin and to a hybrid polyolefin-polyurethane dispersion obtained therefrom.

2. Description of Related Art

The use of polyolefins such as polyethylene, polypropylene, copolymers of ethylene and alpha-olefins, and ethylene-propylene-diene terpolymer (EPDM) continues to grow at a rate faster than that of many other resins due to their low cost and excellent balance between design flexibility, mechanical properties and recyclability.

In order to improve the mechanical properties of the myriad of consumer goods made from the foregoing types of polyolefins, these resins are commonly reinforced with fillers, e.g., glass fibers. Glass fiber-reinforced polyolefins have better dimensional stability, tensile strength, flexural modulus, flexural strength, impact resistance and creep resistance than non-reinforced polyolefins. The glass fibers are generally treated with a sizing composition that performs several functions. It protects the fibers in a strand during processing and it has the capability to couple or adhere the glass fibers to the polyolefin. Aqueous polyolefin emulsions have been found to be useful for glass fiber treatment in polyolefin and thermoplastic polyolefin reinforcement. However, they are not good film-formers and require the use of another film-forming component to achieve additional useful properties such as good strand integrity.

Due to the generally poor photostability of polyolefins, parts made from, e.g., polypropylene and thermoplastic polyolefin, are not used for the exterior parts of automobiles without first being given a protective coating. Another reason for using coatings is the desire that parts made from these resins match the color and gloss of the main automobile body. However, most coating systems cannot be used on polypropylene and thermoplastic polyolefin substrates due to poor adhesion. This lack of adhesion can be attributed to the generally poor wettability, good solvent resistance and very low surface energy of the polyolefins polypropylene and thermoplastic polyolefin. Polypropylene and thermoplastic polyolefin belong to the group of polymers with the lowest surface energy, next to that of the polysiloxanes and fluoropolymers.

The most common approach to overcoming the technical difficulties encountered in the coating of polypropylene, thermoplastic polyolefin and similar polyolefins is to use an adhesion-promoting primer coating based on chlorinated polyolefin resin. Primers often contain significant amounts of volatile organic compounds (VOC). This is a significant disadvantage for a finisher who is required to comply with strict federal and state environmental emission standards. In addition, halogen-containing organics such as chlorinated polyolefin present environmental concerns of their own.

Therefore, it would be advantageous to replace a chlorinated polyolefin based primer with one having good adhesion to polypropylene and thermoplastic polyolefin rubber but lacking a significant VOC component and in addition, lacking a halogen-containing organic component.

It is known to use aqueous polyolefin emulsions for the treatment of fillers used in the reinforcement of polyolefins, as property-enhancing additives and as adhesion promoters.

U.S. Pat. No. 3,814,715 describes a glass fiber aqueous sizing composition containing a low molecular weight polypropylene or polypropylene-polyethylene mixture emulsion with, amongst other components, a coupling agent.

U.S. Pat. No. 4,283,322 describes a glass fiber sizing composition containing an emulsion of a blend of carboxylated isotactic and amorphous polypropylenes having weight average molecular weights of less than 10,000.

U.S. Pat. No. 4,507,430 describes an adhesion or coating material for a polyolefin resin which is derived from a hydrogenated polyalkadiene polyol and a polyisocyanate.

U.S. Pat. No. 4,728,573 describes glass fibers which have been chemically treated with a composition containing amino organo coupling agents, an aqueous emulsion of an acid or anhydride modified polyolefin having one or more surfactants, a stabilizer and a film forming polymer.

U.S. Pat. No. 5,004,784 describes a composition consisting of a blend of two incompatible thermoplastic polymers and an isocyanate reacting agent having a functionality of less than three.

U.S. Pat. No. 5,389,440 describes a sizing coating emulsion containing a high molecular weight crystalline polyolefin an acid material, a base, an emulsifying agent and water.

U.S. Pat. No. 6,008,286 describes a primer composition for application to polymeric substrates, the composition including an aliphatic isocyanate-containing compound, a nonhalogenated hydrocarbon polymer containing organic functional groups, a halogenated hydrocarbon polymer containing organic functional groups, e.g., a maleated chlorinated polyethylene, and an organic solvent.

U.S. Pat. No. 6,166,118 describes a process for emulsifying high molecular weight functionalized polyolefins using emulsifiers and an indirect pressure method. According to the process, a pre-emulsion concentrate with a solids content of 55–90% is produced in the first stage and subsequently diluted to a lower solids content.

U.S. Pat. No. 6,339,125 describes a polyurethane dispersion which is the reaction product of a prepolymer and water or hydrazine as a chain extender, the prepolymer being a reaction product of a hydroxylated polyalkadiene, a bis (hydroxyalkyl) quartenary ammonium-group-containing diol and a polyisocyanate.

U.S. Pat. No. 6,465,559 describes a sizing composition which includes an anionic or cationic polyurethane dispersion, a polyolefin wax and a coupling agent.

WO02/36654 describes an anionic polyurethane dispersion compatible with polyolefins which is a reaction product of a prepolymer and a chain extender.

Polyolefin emulsions known in the art do not provide for continuous film forming and adhesive properties. Therefore, there remains a need for a material in the form of an aqueous dispersion that would provide both film formation and good adhesion to polyolefin substrates.

SUMMARY OF THE INVENTION

It is an object of the present invention to provide a process for making an aqueous emulsion of polyolefin of relatively high weight average molecular weight, i.e., of at least about 30,000.

It is a further object of the present invention to provide a hybrid polyolefin-polyurethane dispersion based on the foregoing emulsion of polyolefin, advantageously, one which lacks any appreciable quantity of volatile organic compound and/or halogen-containing organic compound.

In keeping with these and other objects of the invention there is provided a process for making an aqueous emulsion of polyolefin which comprises:

a) providing a mixture of:
  (1) at least one first polyolefin component possessing carboxylic acid functionality and having a weight average molecular weight of at least about 30,000;
  (2) at least one emulsification facilitating component;
  (3) at least one surfactant in an aqueous emulsion-forming amount; and,
  (4) water in an aqueous emulsion-forming amount;
b) heating the mixture of step (a) to a temperature which is at or above the melting point of the first polyolefin component; and,
c) neutralizing the carboxylic acid functionality of the first polyolefin component while the first polyolefin component is at or above its melting point thereby providing an aqueous emulsion of the first polyolefin component.

In addition, there is provided a process for making a hybrid aqueous dispersion of polyolefin and polyurethane which comprises:

a) providing at least one water-dispersible polyurethane prepolymer;
b) dispersing the water-dispersible polyurethane prepolymer of step (a) in at least one aqueous emulsion of polyolefin prepared by the foregoing emulsification process; and,
c) reacting dispersed polyurethane prepolymer with at least one difunctional chain extender to provide a hybrid aqueous dispersion of polyolefin and polyurethane.

The hybrid aqueous dispersion of polyolefin and polyurethane possesses good film-forming properties at room temperature and is useful in coatings processes where it improves the adhesion of coatings to various kinds of substrates. Another application of the foregoing hybrid aqueous polyolefin-polyurethane dispersion is for the treatment of glass fibers used as fillers in the reinforcement of polyolefin resins such as PE, PP, ethylene/alpha-olefin copolymer, EPDM, and the like. In a preferred embodiment, the hybrid aqueous polyolefin-polyurethane dispersion contains no appreciable quantity of volatile organic compound(s) and/or chlorine-containing organic compound(s).

DESCRIPTION OF THE PREFERRED EMBODIMENTS

In the process of this invention, the first polyolefin component can be derived from any of a variety of polyolefins that are subsequently provided with carboxylic acid functionality employing known and conventional procedures. The expression "carboxylic acid functionality" shall be understood to include the carboxylic acid group, and the anhydride group which in aqueous media undergoes ring-opening to provide carboxylic acid groups. The polyolefins are generally obtained from olefinic monomers containing from 2 to about 8 carbon atoms. Examples of useful polyolefins include, polyethylene, polypropylene, copolymers of ethylene and propylene and/or other alpha-olefins and ter-polymers of ethylene, propylene and at least one other diene monomer such as butadiene. Preferably, the polyolefin is an isotactic polypropylene.

The first polyolefin will ordinarily have a weight average molecular weight of greater than about 30,000 and more preferably greater than about 50,000. The carboxylic functionality of the first functionalized polyolefin can be introduced by any number of known and conventional techniques including, but not limited to, thermal oxidation and the grafting of acids or anhydrides to the polyolefin backbone. Grafting generally involves the reaction of a polyolefin with an ethylenically unsaturated carboxylic acid, polycarboxylic acid or carboxylic acid anhydride. Specific carboxylic acids and carboxylic acid anhydrides that can be grafted onto the first polyolefin include maleic acid, fumaric acid, itaconic acid, citraconic acid, acrylic acid, methacrylic acid, crotonic acid, isocrotonic acid, mesaconic acid, maleic anhydride and itaconic anhydride. The carboxylic functionality of the polyolefin can also be introduced via co polymerization of carboxylic functionality-containing olefinic monomer such as acrylic or methacrylic acids, and the like.

Preferably, functionalization of the first polyolefin component is achieved by grafting maleic anhydride to the polyolefin employing any of the known maleation procedures. The amount of grafted maleic anhydride in the maleated polyolefin is advantageously at least about 0.5 wt percent, and preferably, is from about 1 to about 1.5 wt percent, of the first functionalized polyolefin component. Examples of suitable first polyolefin components include Polybond 3000 and Polybond 3200 (maleated polypropylene, Crompton, Middlebury Conn.)

High molecular weight polyolefins such as the first polyolefin herein can be difficult to emulsify due to their relatively high melt viscosities. To deal with this technical problem, the emulsification process of this invention combines the first polyolefin component with an emulsification facilitating component which (1) possesses a molecular weight significantly below that of the first polyolefin component, (2) is compatible with the first polyolefin component, i.e., does not readily separate from mixtures containing the first polyolefin component, (3) is chemically stable at the elevated temperature of the emulsification process and, optionally, (4) contains carboxylic acid and/or carboxylic acid anhydride functionality. Due to its having a molecular weight that is considerably lower than that of the first polyolefin component, when the emulsification facilitating component is combined with the first polyolefin component, the resulting mixture will possess a lower overall viscosity, as such making it more readily emulsifiable. The emulsification facilitating component is advantageously selected from the group consisting of second, preferably functionalized, polyolefin having a weight average molecular weight appreciably less than that of the first polyolefin, e.g., less than about 10,000, fatty acids and mixtures thereof.

The functionality of the second polyolefin, when present, can be the same or different carboxylic acid and/or carboxylic acid anhydride functionality mentioned above for the first polyolefin, with grafted maleic anhydride being preferable. The grafted maleic anhydride of the functionalized second polyolefin is advantageously present therein in an amount of at least about 3, and preferably at a level of from about 5 to about 7, wt percent. Examples of useful functionalized second polyolefins include A-C596 and A-C597 (polypropylene-maleic anhydride co-polymers, Honeywell Specialty Chemicals Morristown, N.J.).

In addition to or as an alternative to the aforedescribed second polyolefin, a fatty acid can be utilized to facilitate the emulsification of the first polyolefin. The functionalized fatty acid preferably contains from about 8 to about 22 carbon atoms and can be selected from among such mono-, and poly-carboxylic acid functional fatty acids as myristic acid, stearic acid, palmitic acid, oleic acid, linoleic acid, fumaric acid, tall oil fatty acids, dimer acids and mixtures thereof.

Surfactants useful for the emulsification of the first polyolefin according to the present invention include those of the anionic, cationic and nonionic types. Mixtures of two or more surfactants with different hydrophilic-lipophilic balances (HLB) are recommended in order to improve colloidal stability as well as to improve melt flow and adjust the particle size and viscosity of the emulsion. Preferably, one surfactant will have an HLB of from about 3 to about 6 while the other surfactant will have an HLB of from about 10 to about 16. Preferred nonionic surfactants include oxyethylated alkyl phenols and oxyethylated fatty alcohols. Particular examples of suitable surfactants include oxyethylated fatty alcohols containing from about 12 to about 20 carbon atoms in their fatty aliphatic moiety and from about 1 to about 100 oxyethylene units.

The amounts of first polyolefin component, emulsification facilitating component, surfactant and water utilized in the preparation of a particular emulsion will depend upon a number of well-understood factors including the specific nature of the non-aqueous components and the particular end-use or application to which the emulsion will be put. These amounts can vary within fairly wide limits. In general, an emulsion in accordance with the invention can contain from about 50 to about 95, and preferably from about 65 to about 90, wt percent first polyolefin component, from about 5 to about 50, and preferably from about 10 to about 35, wt percent emulsification facilitating component, an emulsion-forming amount of surfactant, e.g., from about 5 to about 30, and preferably from about 10 to about 25, wt percent surfactant, the balance of the emulsion being made up of water.

The process of the invention requires heating the above-described mixture of first polyolefin component, emulsification facilitating component, surfactant and water to an elevated temperature which is at or above the melting point of the first polyolefin. In order to achieve such a temperature, the components of the emulsion-forming composition must be heated in a sealed vessel thus subjecting the composition to elevated pressure. Suitable elevated temperatures can range from about 150 to about 250° C., and preferably from about 165 to about 200° C., depending on the nature and amounts of the various components of the emulsion to be formed. The pressure in the sealed vessel at these temperatures can vary from about 75 to about 300 psi. While the contents of the vessel are at the elevated temperature and pressure, i.e., while the first polyolefin is at or above its melt temperature, carboxylic acid groups present on the first polyolefin and those that may be present on the emulsification facilitating component are neutralized with a base. Suitable bases for achieving neutralization include alkali and alkaline earth metal hydroxides, ammonium hydroxide and amine compounds such as aqueous ammonia, 2-dimethylamino-2-methyl-1-propanol, N,N-diethylaminoethanol or N,N-dimethylaminopropanol, triethyl amine, triisopropyl amine, tributyl amine, N,N-dimethyl-cyclohexyl amine, N,N-dimethyl stearyl amine, N,N-dimethylaniline, N-methylmorpholine, N-ethylmorpholine, N-methylpiperazine, N-methylpyrrolidine, N-piperidine, N,N-dimethyl-ethanol amine, N,N-diethyl-ethanol amine, triethanol amine, N-methyldiethanol amine, dimethylaminopropanol, 2-methoxyethyldimethyl amine, N-hydroxyethylpiperazine; 2-(2-dimethylaminoethoxy)-ethanol and 5-diethylamino-2-pentanone. It may be noted that addition of neutralizing base to the contents of the vessel prior to heating will fail to provide an emulsion as demonstrated in Comparative Examples 1–4, infra. The temperature and pressure are maintained, preferably with constant stirring of the vessel contents, for a period of time sufficient to provide the aqueous emulsion of polyolefin, e.g., from about 20 minutes to about 8 hours and preferably from about 40 minutes to about 2 hours.

The average particle size and viscosity of the emulsified polyolefin can vary widely depending on the choice and amounts of its components. In general, the average particle size of the emulsified polyolefin can range from about 0.03 to about 6 microns and the viscosity can range from about 10 to about 2000 centipoise (cps). Preferably, the average particle size will range from about 0.05 to about 3.0 microns and the viscosity will range from about 20 to about 400 cps.

The present invention further involves utilizing the aqueous emulsion of polyolefin to prepare a hybrid aqueous dispersion of polyolefin and polyurethane. The process of preparing the hybrid dispersion comprises providing at least one water-dispersible polyurethane prepolymer, dispersing the prepolymer in at least one aqueous emulsion of polyolefin as described above and adding a difunctional chain extender to the dispersion which then reacts with polyurethane prepolymer to form polyurethane.

The water-dispersible polyurethane prepolymer can be prepared by reacting, (a) a mixture of active hydrogen functionality-containing compound selected from at least one member of the group consisting of (i) hydrocarbon polymer containing at least one terminal hydroxyl group, (ii) hydrophilic group-containing diol and, optionally, (iii) at least one member of the group consisting of polymeric polyol, low molecular weight diol, monofunctional reactant and trifunctional or higher functionality branching reactant, with (b) at least one diisocyanate.

Hydrocarbon polymer (i) can be obtained from the polymerization of at least one olefinic monomer, diene monomer or vinyl monomer. Preferably hydrocarbon polymer (i) is a hydroxyl-terminated polybutadiene or a hydrogenated derivative thereof. Examples of useful hydrocarbon polymers include, for example, polybutadiene diols with hydroxyl functionality ranging from 2 to 2.5, e.g., Polybond R45 HTLO and Krasol HLB 2000 (Sartomer, a Division of Atofina Exton, Pa.)

Hydrophilic group-containing diol (ii) is at least one member selected from the group consisting of ionic group-containing compound, ion-forming group containing compound, which is any compound containing a functional group, e.g. —COOH, which can be ionized to facilitate reactivity, e.g., dimethylol propane and terminal nonionic hydrophilic group-containing compounds such as methoxy poly(oxyethylene). It is to be understood that cationic polyurethane prepolymers can be dispersed only into a cationic polyolefin emulsion to yield a cationic hybrid.

The terminal nonionic hydrophilic group-containing compound can be a polyethylene oxide and the ionic group-containing compound can be at least one member selected from the group consisting of carboxylate compound, sulfonate compound and quaternary nitrogen compound. Advantageously, the ionic group-containing compound is a dihydroxy alkanoic acid such as dimethylol propionic acid or dimethylol butanoic acid. The ionic groups are formed by neutralizing the corresponding potential ionic groups prior to, during, or after forming the water-dispersible polyurethane prepolymer.

Polymeric polyol (iii) is well known in the field of polyurethane chemistry. Examples of suitable polymeric polyols include the polyester diols, polyether diols, polyetherester diols, polyesterether diols, polythioester dithiols, polycarbonate diols, polyacetal diols, polycaprolactone polyols and mixtures thereof.

Advantageously, a low molecular weight dihydroxy compound such as a short chain aliphatic diol can also be used. A preferred short chain aliphatic diol is trimethylolpropane which can be used when slight branching of the water-dispersible polyurethane prepolymer is desired.

Diisocyanate (b) is preferably one conforming to the general formula $R(NCO)_2$ wherein R is a divalent aliphatic group containing from 4 to about 18 carbon atoms or a divalent cycloaliphatic group containing from 5 to about 15 carbon atoms and mixtures thereof. Suitable diisocyanates include hexamethylene diisocyanate, cyclohexane-1,3-diisocyanate, cyclohexane-1,4-diisocyanate, 1-isocyanato-3-isocyanatomethyl-3,5,5-trimethyl-cyclohexane, bis-(4-isocyanatocyclohexyl)methane, 1,3-bis-(isocyanatomethyl) cyclohexane, 1,4-bis-(isocyanatomethyl)cyclohexane and bis-(4-isocyanato-3-methyl-cyclohexyl)methane.

The ratio of isocyanate groups in the diisocyanate to active hydrogen functionality in the active hydrogen functionality-containing compound can range from about 1.1 to about 3, and preferably from about 1.2 to about 2, on an equivalent basis. This invention also contemplates possible chemical bonding through the reaction of the polyurethane prepolymer component of the hybrid dispersion and the neutralized carboxylic acid functionality of the first polyolefin component.

Providing polypropylene emulsions with additional active hydrogen functionality can further facilitate chemical bonding. This can be done by first reacting the maleated PP with, for example, amines, alkanol amines, alkyl ether amines, diamines, epoxides, and the like, followed by emulsification of the resulting product as described previously. Preferred compounds include, but are not limited to, polyethylene glycol monomethyl ether such as Polyglykol M (Clariant GMBH, Germany), alkyl ether amine, methoxypoly-oxyethylene/oxypropylene)-2-propylamine, glycidyl ester of versatic acid, carboxylic acid, carboxylic acid anhydride, hydroxylamine, 2-aminoethanol, diethanolamine, 2-(diethanolamino)ethylamine and 3-(diethanolamine)propylamine. Use of dialkylaminoalkylamines such as 2-(dimethylamino) ethylamine, 3-(diethylamino)propylamine, for reaction with the carboxylate groups of the first polyolefin will provide quarternizable centers which are useful for achieving cationic colloidal stabilization of the hybrid aqueous dispersion.

The dispersion of the polyurethane prepolymer into the aqueous polypropylene emulsion is formed by adding the polyurethane prepolymer with agitation to the aqueous polypropylene emulsion or by adding the polyurethane prepolymer with continuous agitation either in a batch-types process or a continuous process, e.g., by utilizing a pin-mixer.

After the water-dispersible polyurethane prepolymer is dispersed into the aqueous polypropylene emulsion it can be chain extended with any of a variety of difunctional compounds or mixtures thereof. The difunctional chain extender advantageously used herein is a diamine such as hydrazine, adipic dihydrazide, ethylene diamine, hexane diamine, diisophorone diamine, polyoxypropylene diamine, 2-methyl pentane diamine, piperazine or mixtures thereof. In some instances where higher cross-link density is desirable, a small amount of a trifunctional amine such as diethylene triamine can optionally be added during the chain-extension step. Similarly, hydroxyl functionality can be introduced into the hybrid during the chain extension reaction by employing alcohol amines such as hydroxyethyl ethylenediamine, diethanolamine, and the like.

While the water-dispersible polyurethane prepolymer can be prepared employing an inert organic solvent, e.g., an ether, ester, ketone, amide, etc., it is preferred to exclude the use of such a material as it is often advantageous to provide the final hybrid polyolefin-polyurethane dispersion substantially free of volatile organic compounds.

Examples 1–4 illustrate the preparation of functionalized polyolefin emulsion according to the present invention, Comparative Examples 1–4 show that omitting to neutralize the carboxylic acid groups of the first polyolefin while the latter is at or above its melt temperature fails to provide an emulsified product and Examples 5–8 illustrate the preparation of hybrid polyolefin-polyurethane dispersions in accordance with the invention.

EXAMPLE 1

112.5 grams of maleated polypropylene Polybond 3000 (weight average molecular weight 60,000), 37.5 grams of maleaed polypropylene wax A-C 597 (weight average molecular weight less than 10,000), 41.3 grams of non-ionic surfactant Tomadol 25-9 (oxyethylated fatty alcohols C12–C15, EO=9), 3.8 grams of nonionic Tomadol 23-1 (oxyethylated fatty alcohols C12–C13, EO=1) and 417.1 grams of water were charged in a pressure reactor equipped with stirrer and heated to 170° C. The pressure in the reactor at this temperature rose to approximately 100 psi. While the temperature was kept at this level, a solution of 5.76 grams of KOH pre-dissolved in 52.5 grams of water was transferred from a feed vessel using nitrogen pressure. After the temperature was maintained at 170° C. for an hour, the batch was slowly cooled down to room temperature. The resulting emulsion was pale white with an average particle size of 120 nanometers and a solids content of 28.9%.

EXAMPLE 2

112.5 grams of maleated polypropylene Polybond 3000 (weight average molecular weight 60,000), 37.5 grams of maleaed polypropylene wax A-C 597 (weight average molecular weight less than 10,000), 41.3 grams of non-ionic surfactant Tomadol 25-9 (oxyethylated fatty alcohols C12–C15, EO=9), 3.8 grams of nonionic Tomadol 23-1 (oxyethylated fatty alcohols C12–C13, EO=1) and 417.1 grams of water were charged in a pressure reactor equipped with stirrer and heated to 175° C. The pressure in the reactor at this temperature rose to approximately 112 psi. While the temperature was kept at this level, a solution of 10.4 grams 2-dimethylamino-methyl-1-propanol (DMAMP-80, 80% in water) in addition 66.0 grams of water was transferred from a feed vessel using nitrogen pressure. After the temperature was maintained at 175° C. for an hour, the batch was slowly cooled down to room temperature. The resulting emulsion was pale white with average particle size of 70 nanometers and a solids content of 29.9%.

EXAMPLE 3

120.5 grams of maleated polypropylene Polybond 3000 (weight average molecular weight 60,000), 30.0 grams of stearic acid, 41.3 grams of nonionic surfactant Tomadol 25-9 (oxyethylated fatty alcohols C12–C15, EO=9), 3.8 grams of nonionic Tomadol 23-1 (oxyethylated fatty alcohols C12–C13, EO=1) and 400.0 grams of water were charged in a pressure reactor equipped with stirrer and heated to 175° C. The pressure in the reactor at this temperature rose to approximately 115 psi. While the temperature was kept at this level, a solution of 18.6 grams 2-dimethylamino-methyl-1-propanol (DMAMP-80, 80% in water) in addition to 53.0 grams of water was transferred from a feed vessel using nitrogen pressure. After the temperature was maintained at 175° C. for an hour, the batch was slowly cooled down to room temperature. The resulting emulsion was pale white with an average particle size of 90 nanometers and a solids content of 29.6%.

EXAMPLE 4

112.5 grams of maleated polypropylene Polybond 3000 (weight average molecular weight 90,000), 37.5 grams of maleaed polypropylene wax A-C 597 (weight average molecular weight less than 10,000), 35.3 grams of non-ionic surfactant Tomadol 25-9 (oxyethylated fatty alcohols C12–C15, EO=9), 3.8 grams of nonionic Tomadol 23-1 (oxyethylated fatty alcohols C12–C13, EO=1) and 397.5 grams of water were charged in a pressure reactor equipped with stirrer and heated to 200° C. The pressure in the reactor at this temperature rose to approximately 180 psi. While temperature the temperature was kept at this level, a solution of 12.7 grams 2-dimethylamino-methyl-1-propanol (DMAMP-80, 80% in water) in addition to 63.0 grams of water was transferred from a feed vessel using nitrogen pressure. After the temperature was maintained at 200° C. for an hour, the batch was slowly cooled down to room temperature. The resulting emulsion was pale white with an average particle size of 70 nanometers and a solids content of 30.1%.

COMPARATIVE EXAMPLES 1–4

The components of the aqueous medium, which were identical with those of Examples 1–4, supra, were charged into a pressure reactor equipped with stirrer together with neutralizing base (DMAMP-80 solution). After heating the batch to 170–200° C. and maintaining the temperature at this level for the same period of time as in Examples 1–4, each batch was cooled to room temperature. An emulsion did not form; instead, a course dispersion containing large flakes was obtained which quickly settled without agitation. Large amounts of the polypropylene were observed to have formed a sponge-like material on the top of the liquid.

EXAMPLE 5

76.7 g of hydroxyl-terminated polybutadiene Krason LBH 2000, having an average molecular weight of 2,000 (Sartomer, a division of Atofina, Exton, Pa.); 25.6 g of polypropylene glycol (PPG-2000) having a molecular weight of 2,000, 11.9 g of dimethylolpropionic acid, 18.0 g of N-methylpyrrolidinone (M-Pyrol) and 42.0 g of isophorone diisocyanate (IPDI) were charged to a glass reactor equipped with a stirrer and heated to 80° C. After the temperature had been maintained at 80° C. for three hours, the free NCO content dropped to 3.67%. The resulting polyurethane prepolymer was then dispersed into a mixture of 543.8 g of aqueous polypropylene emulsion prepared according to Example 4, 340.0 g of water and 9.3 g of triethylamine. The resulting hybrid dispersion was treated with 5 g of 35% aqueous hydrazine monohydrate solution for prepolymer chain extension. The dispersion was continuously stirred for an additional hour at approximately 30–40° C. in order to complete the chain extension process. The hybrid polyurethane-polyolefin dispersion had a solids content of 30.4 wt %, a pH of 8.7, a viscosity of 30 cPs (Brookfield LV, spindle #2 @ 60 rpm) and an average particle size of 140 nm.

EXAMPLE 6

Polyurethane prepolymer prepared as described in Example 5 was dispersed in 1097 g of the aqueous polypropylene emulsion of Example 4, 340 g of water containing 9.39 g of triethylamine and chain extended with 5 g of 35% aqueous hydrazine solution. The resulting hybrid dispersion had a solids content of 30.6 wt %, a pH of 7.3 and a viscosity of 500 cps as measured by Broockfield viscometer using spindle #2 at 60 rpm.

EXAMPLE 7

A hydrocarbon-modified polyurethane dispersion, prepared as described in Example 5 of the present invention, was blended with the functionalized polyolefin emulsion, prepared as described in Example 4 of the present invention. The resulting blend was very viscous (>20,000 cps) with a 30.1% solids content and a pH of 8.7.

EXAMPLE 8

In order to evaluate the performance of the polyolefin-polyurethane hybrid dispersion of this invention as a glass fiber sizing composition, a test was performed with a simple composite material comprised of two layers of polypropylene with a glass fiber woven fabric in between as the substrate.

The glass fiber woven fabric substrate was treated with a generic sizing composition comprised of a film former and an aminosilane coupling agent Silquest A-1100 (gamma—aminopropyl triethoxy silane from Crompton Corp.)

Various sizing formulations were prepared at a 15% solids level with 0.6 wt. % of A-1100. The glass fiber fabric was washed with isopropyl alcohol to remove any previously applied sizing composition, dried, then it was placed into a bath with a sizing composition and an excess of sizing composition was removed by pulling the fabric through a narrow gap between two metal bars. The fabric was dried at 60° C. overnight and then at 120° C. for 20 minutes before sealing it. The sized fabric was then sealed between two 30 mil-thick sheets of polypropylene at 350° F./40 psi for from 30 seconds to about 1 minute. Three two-inch wide specimens of each sizing formula were then cut for testing. The sealed area was one-inch wide.

The bond strength between the glass surface and the polypropylene matrix was evaluated by a T-peel adhesion test as measured on an Instron Material Testing Machine at a 20 in/min pulling rate. The results were as follows:

| Component | Solids, % | pH | Viscosity, cps (Brookfield LV, Spindle #2 @ 60 rpm | T-peel PP-to-glass adhesion, pli |
|---|---|---|---|---|
| PP emulsion (Example 4 of the present invention) | 29.8 | 9.3 | 10 | 5.4 |
| Polyurethane dispersion (Example 6 of the present invention) | 30.6 | 7.3 | 500 | 4.1 |
| PP emulsion-PU dispersion blend (Example 7 of the present invention) | 30.1 | 8.7 | >20,000 | 7.8 |
| PP-PU hybrid dispersion (Example 8 of the present invention) | 30.4 | 8.7 | 30 | 11.3 |

The foregoing data show that the glass sized with the PP-PU hybrid dispersion of Example 8 exhibited the strongest bonding to the polypropylene.

What is claimed is:

1. A process for making an aqueous emulsion of polyolefin which comprises:
   a) providing a mixture of:
      (1) at least one first polyolefin component possessing carboxylic acid functionality and having a weight average molecular weight of at least about 30,000;
      (2) at least one emulsification facilitating component comprising a second polyolefin component having a weight average molecular weight less than that of the first polyolefin component;
      (3) at least one surfactant in an aqueous emulsion-forming amount; and,
      (4) water in an aqueous emulsion-forming amount;
   b) heating the mixture of step (a) to a temperature which is at or above the melting point of the first polyolefin component; and,
   c) neutralizing the carboxylic acid functionality of the first polyolefin component while the first polyolefin component is at or above its melting point thereby providing an aqueous emulsion of the first polyolefin component.

2. The process of claim 1 wherein the at least one emulsification facilitating component further includes at least fatty acid.

3. The process of claim 1 wherein the carboxylic acid functionality of the first polyolefin component is present as grafted maleic anhydride in an amount of at least about 0.5 wt percent of the first polyolefin component.

4. The process of claim 1 wherein the carboxylic acid functionality of the first polyolefin component is present as grafted maleic anhydride in an amount of from about 1 to about 1.5 wt percent of the first polyolefin component.

5. The process of claim 1 wherein the carboxylic acid functionality of the second polyolefin is present as grafted maleic anhydride in an amount of at least about 3 wt percent of the second polyolefin.

6. The process of claim 1 wherein the carboxylic acid functionality of the second polyolefin is present as grafted maleic anhydride in an amount of from about 5 to about 7 wt percent of the second polyolefin.

7. The process of claim 1 wherein the first polyolefin component has a weight average molecular weight of at least about 50,000.

8. The process of claim 1 wherein the first polyolefin component is at least one member of the group consisting of functionalized polyethylene, functionalized polypropylene, functionalized copolymer of ethylene and at least one other alpha-olefin and functionalized terpolymer of ethylene, propylene and at least one diene monomer.

9. The process of claim 8 wherein the functionalized polypropylene is a functionalized isotactic polypropylene.

10. The process of claim 8 wherein the functionalized terpolymer of ethylene, propylene and at least one diene monomer is a functionalized terpolymer of ethylene, propylene and butadiene.

11. The process of claim 1 wherein the second polyolefin has a weight average molecular weight of less than about 10,000.

12. The process of claim 1 wherein the second polyolefin is at least one member of the group consisting of functionalized polyethylene, functionalized polypropylene, functionalized copolymer of ethylene and at least one other alpha-olefin and functionalized terpolymer of ethylene, propylene and at least one diene monomer.

13. The process of claim 12 wherein the functionalized polypropylene is a functionalized isotactic polypropylene.

14. The process of claim 12 wherein the functionalized terpolymer of ethylene, propylene and at least one other diene monomer is a functionalized terpolymer of ethylene, propylene and butadiene.

15. The process of claim 1 wherein the surfactant is at least one member of the group consisting of anionic surfactant, cationic surfactant and nonionic surfactant.

16. The process of claim 15 wherein the surfactant is a mixture of at least two surfactants of different hydrophilic-lipophilic balance.

17. The process of claim 15 wherein the surfactant is a mixture of at least two surfactants, one of the surfactants possessing a hydrophilic-lipophilic balance of from about 3 to about 6 and another surfactant having a hydrophilic-lipophilic balance of from about 10 to about 16.

18. The process of claim 15 wherein the surfactant is at least one nonionic surfactant selected from the group consisting of oxyethylated alkyl phenol and oxyethylated fatty alcohol.

19. The process of claim 1 wherein the mixture of step (a) contains from about 50 to about 95 wt percent of first functionalized polyolefin component from about 5 to about 50 wt percent total of functionalized emulsification facilitating component, from about 5 to about 30 wt percent surfactant and from about 45 to about 85 wt percent water.

20. The process of claim 1 wherein the mixture of step (a) contains from about 75 to about 90 wt percent of first functionalized polyolefin component, from about 10 to about 25 wt percent total of functionalized emulsification facilitating component, from about 10 to about 20 wt percent surfactant and from about 55 to about 70 wt percent water.

21. A process for making a hybrid aqueous dispersion of polyolefin and polyurethane which comprises:
   (a) providing at least one water-dispersible polyurethane prepolymer;
   (b) dispersing the water-dispersible polyurethane prepolymer of step (a) in at least one aqueous emulsion of polyolefin prepared by the process of
      i) providing a mixture of:
         (1) at least one first polyolefin component possessing carboxylic acid functionality and having a weight average molecular weight of at least about 30,000;
         (2) at least one emulsification facilitating component comprising a second optionally functionalized polyolefin having a weight average molecular weight less than that of the first polyolefin component;
         (3) at least one surfactant in an aqueous emulsion-forming amount; and,
         (4) water in an aqueous emulsion-forming amount;
      ii) heating the mixture of step (i) to a temperature which is at or above the melting point of the first polyolefin component; and,
      iii) neutralizing the carboxylic acid functionality of the first polyolefin component while the first polyolefin component is at or above its melting point thereby providing an aqueous emulsion of the first polyolefin component, and
   (c) reacting dispersed polyurethane prepolymer with at least one difunctional chain extender to provide a hybrid aqueous dispersion of the water-dispersible polyurethane prepolymer and functionalized polyolefin.

22. The process of claim 21 wherein the water-dispersible polyurethane prepolymer is prepared by reacting
(a) a mixture of active hydrogen functionality-containing compound selected from at least one member of the group consisting of
  (i) hydrocarbon polymer containing at least one terminal hydroxyl group,
  (ii) hydrophilic group-containing diol and, optionally,
  (iii) at least one member of the group consisting of polymeric polyol, low molecular weight diol, monofunctional reactant and trifunctional or higher functionality branching reactant, with
(b) at least one diisocyanate.

23. A process for making a hybrid aqueous dispersion of functionalized polyolefin and polyurethane which comprises:
a) providing at least one water-dispersible polyurethane prepolymer;
b) dispersing the water-dispersible polyurethane prepolymer of step (a) in at least one aqueous emulsion of functionalized polyolefin which comprises
  i) at least one first polyolefin component possessing carboxylic acid functionality and having a weight average molecular weight of at least about 30000,
  ii) at least one emulsification facilitating component,
  iii) at least one surfactant in an aqueous emulsion-forming amount, and
  iv) water in an aqueous emulsion forming amount and,
c) reacting dispersed polyurethane prepolymer with at least one difunctional chain extender to provide a hybrid aqueous dispersion of the water-dispersible polyurethane prepolymer and polyolefin.

24. The process of claim 23 wherein the water-dispersible polyurethane prepolymer is prepared by reacting,
(a) a mixture of active hydrogen functionality-containing compound selected from at least one member of the group consisting of
  (i) hydrocarbon polymer containing at least one terminal hydroxyl group,
  (ii) hydrophilic group-containing diol and, optionally,
  (iii) at least one member of the group consisting of polymeric polyol, low molecular weight diol, monofunctional reactant and trifunctional or higher functionality branching reactant, with
(b) at least one diisocyanate.

25. The process of claim 24 wherein hydrocarbon polymer (i) is obtained from the polymerization of at least one olefinic monomer.

26. The process of claim 24 wherein hydrocarbon polymer (i) is a hydroxyl-terminated polybutadiene or a hydrogenated derivative thereof.

27. The process of claim 24 wherein hydrophilic group-containing diol (ii) is at least one member selected from the group consisting of ionic group-containing compound, ion-forming group-containing compound and terminal nonionic hydrophilic group-containing compound.

28. The process of claim 27 wherein the ionic group-containing compound is a/t least one member selected from the group consisting of carboxylate compound, sulfonate compound and quaternary nitrogen compound, the ion-forming group-containing compound is dimethylol propane and the terminal nonionic hydrophilic group-containing compound is a polyethylene oxide.

29. The process of claim 27 wherein the ionic group-containing compound is a dihydroxy alkanoic acid.

30. The process of claim 29 wherein the dihydroxy alkanoic acid is at least one member selected from the group consisting of dimethylol propionic acid and dimethylol butanoic acid.

31. The process of claim 24 wherein the polymeric polyol (iii) is at least one member selected from the group consisting of polyester diol, polyether diol, polyetherester diol, polyesterether diol, polythioester dithiol, polycarbonate diol, polyacetal diol, polycaprolactone polyol and mixtures thereof.

32. The process of claim 24 wherein low molecular weight diol (iii) is a short chain aliphatic diol.

33. The process of claim 32 wherein the short chain aliphatic diol is trimethylolpropane.

34. The process of claim 24 wherein the diisocyanate is of the general formula $R(NCO)_2$ wherein R is selected from the group consisting of divalent aliphatic group containing from 4 to about 18 carbon atoms and divalent cycloaliphatic group containing from 5 to about 15 carbon atoms.

35. The process of claim 34 wherein the diisocyanate is at least one member selected from the group consisting of hexamethylene diisocyanate, cyclohexane-1,3-diisocyanate, cyclohexane-1,4-diisocyanate, 1-isocyanato-3-isocyanatomethyl-3,5,5-trimethyl-cyclohexane, bis-(4-isocyanatocyclohexyl)methane, 1,3-bis-(isocyanatomethyl)cyclohexane, 1,4-bis-(isocyanatomethyl)cyclohexane and bis-(4-isocyanato-3-methyl-cyclohexyl)methane.

36. The process of claim 23 wherein the difunctional chain extender is at least one diamine selected from the group consisting of hydrazine, adipic dihydrazide, ethylene diamine, hexane diamine, diisophorone diamine, polyoxypropylene diamine, 2-methyl pentane diamine and piperazine.

37. The process of claim 23 wherein during chain-extending step (c) the difunctional chain extender optionally includes a trifunctional amine, an alcohol amine or mixtures thereof.

38. The process of claim 24 wherein the ratio of isocyanate groups in the diisocyanate to active hydrogen functionality in the active hydrogen functionality containing compound is from about 1.1 to about 3 on an equivalent basis.

39. The process of claim 24, wherein the ratio of isocyanate groups in the diisocyanate, to active hydrogen functionality in the active hydrogen functionality containing compound is from about 1.2 to about 2 on an equivalent basis.

40. The process of claim 23 wherein the emulsion facilitating component comprises a second polyolefin component having carboxylic acid functionality and a weight average molecular weight of no more than 10,000.

41. The process of claim 1 wherein the second polyolefin component possesses carboxylic acid functionality.

42. The process of claim 41 wherein the carboxylic acid functionality of the second polymeric component is present as grafted maleic anhydride.

* * * * *